(12) United States Patent
Marjelund et al.

(10) Patent No.: US 8,054,782 B2
(45) Date of Patent: Nov. 8, 2011

(54) DELIVERING SERVICES IN A WIRELESS COMMUNICATIONS SYSTEM

(75) Inventors: Pekka Marjelund, Muijala (FI); Johanna Pekonen, Espoo (FI)

(73) Assignee: Nokia Corporation, Espoo (FI)

( * ) Notice: Subject to any disclaimer, the term of this patent is extended or adjusted under 35 U.S.C. 154(b) by 1382 days.

(21) Appl. No.: 11/089,027

(22) Filed: Mar. 25, 2005

(65) Prior Publication Data
US 2005/0237933 A1    Oct. 27, 2005

(30) Foreign Application Priority Data

Mar. 30, 2004  (GB) .................................. 0407140.3

(51) Int. Cl.
*H04Q 7/00* (2006.01)
(52) U.S. Cl. ......................... 370/329; 370/341; 455/450
(58) Field of Classification Search .................. 370/310, 370/329, 341; 455/450
See application file for complete search history.

(56) References Cited

U.S. PATENT DOCUMENTS

| | | | |
|---|---|---|---|
| 6,374,112 B1 | 4/2002 | Widegren et al. | |
| 6,668,175 B1 | 12/2003 | Almgren et al. | |
| 7,215,637 B1 * | 5/2007 | Ferguson et al. | 370/230.1 |

FOREIGN PATENT DOCUMENTS

| | | |
|---|---|---|
| JP | 9-130313 A | 5/1997 |
| JP | 2001-274742 A | 10/2001 |
| JP | 2003-516032 A | 5/2003 |
| WO | WO 01/03461 A1 | 1/2001 |
| WO | WO 01/11910 A1 | 2/2001 |
| WO | WO 01/41376 A2 | 6/2001 |

OTHER PUBLICATIONS

Japanese Office Action, Patent Application No. JP 2007-501381, Dispatch Date: Feb. 2, 2009, English Translation: pp. 1-3.

* cited by examiner

*Primary Examiner* — Temica M Beamer
(74) *Attorney, Agent, or Firm* — Squire, Sanders & Dempsey (US) LLP (57) ABSTRACT

A method of delivering services in a wireless communications system comprising a radio access network and a core network, the method comprising the steps of: establishing a radio access bearer for delivering one of a set of services to an end user via a signalling channel, each service having certain delivery requirements; determining in the radio access network that the delivery requirement for one of said services cannot be met; advising the core network that the delivery requirement for the said one service cannot be met; and providing a radio access bearer to allow at least one other service in the set to be delivered to that end user.

29 Claims, 6 Drawing Sheets

FIG. 2

| GMM / SM | MM / CC |
|---|---|
| RANAP ||
| SC_CP ||
| MJVA | NTP3 - B |
| SCTP | SSCF - NNI |
| IP | SSCOP |
| AAL5 ||
| ATM ||

DELIVERING SERVICES IN A WIRELESS COMMUNICATIONS SYSTEM

The present invention relates to the delivery of services in a wireless communications system, particularly where those services have different delivery requirements, for example but not limited to speech and video.

In the situation where an end user is receiving multiple services, for example video and speech where he can swap between them, it is highly probably that the services are of a different nature and may consume different amounts of resources of a radio access network (RAN), typically due to the user bit rate difference in the requirements of the services. This could lead to a situation in some circumstances where the radio access network cannot necessarily maintain the higher demanding service, but could maintain the less demanding service. Furthermore, the radio access network could provide even more resources for the end user if it is only using the less demanding service. Such resources include the uplink/downlink power (i.e. cell coverage, capacity) the physical resources of the base station (BTS) and the transport and logical resources of the radio network controller (RNC).

The present invention seeks to provide a system for resolving such a situation.

According to one aspect of the invention there is provided a method of delivering services in a wireless communications system comprising a radio access network and a core network, the method comprising the steps of: establishing a radio access bearer for delivering one of a set of services to an end user, each service having certain delivery requirements; determining in the radio access network that the delivery requirement for one of said services cannot be met; advising the core network that the delivery requirement for the said one service cannot be met; and providing a radio access bearer to allow at least one other service in the set to be delivered to that end user.

The step of providing a radio access bearer can be implemented in one of two ways. The radio access bearer which was established in the first step of the method can be modified. Alternatively, the radio access bearer which was established in the first step of the method can be released, and a new radio access bearer can be established.

Another aspect provides a wireless communications system comprising a radio access network and a core network and including at least one end user receiving one of a set of services delivered by a radio access bearer, each service having certain delivery requirements, the wireless communications system further comprising: means for determining in the radio access network that the delivery requirement of one of said services cannot be met, and advising the core network; and means for providing a radio access bearer to allow at least one other service in the set to be delivered to that end user.

A further aspect provides a network entity for a wireless communications system in which a radio access bearer delivers at least one of a set of services to an end user, the services having certain delivery requirements, the network entity comprising: means for determining that the delivery requirement for one of said services cannot be met in the radio access network, and advising the core network; and means for providing a radio access bearer to allow at least one other service in the set to be delivered to that end user.

A further aspect provides a computer program product comprising program code means executable in a processor of a network entity in a radio access network of a wireless communications system to implement the following steps: determining in the radio access network that the delivery requirement of one of a set of deliverable services cannot be met; advising the core network that the delivery requirements for the said one service cannot be met; and providing a radio access bearer to allow at least one other service in the set to be delivered to that end user.

Thus, in the following described embodiment of the present invention when a radio access bearer has been established, a radio network controller obtains the indication (for example from the circuit switched network core) that the service provided with that radio access bearer can be downgraded or upgraded (e.g. circuit switched (CS) video to speech and vice versa). Based on this indication, the radio network controller may proceed to downgrade the service and not continue with the original service in the case where the radio conditions are no longer met, or upgrade the service where the radio conditions improve to the extent that the other service can again be delivered. In the case of downgrading, in this way the connection can be maintained and not lost when it is too poor for the circuit switched video, but good enough for speech.

For a better understanding of the present invention and to show how the same may be carried into effect, reference will now be made by way of example to the accompanying drawings, in which.

Figure 1:
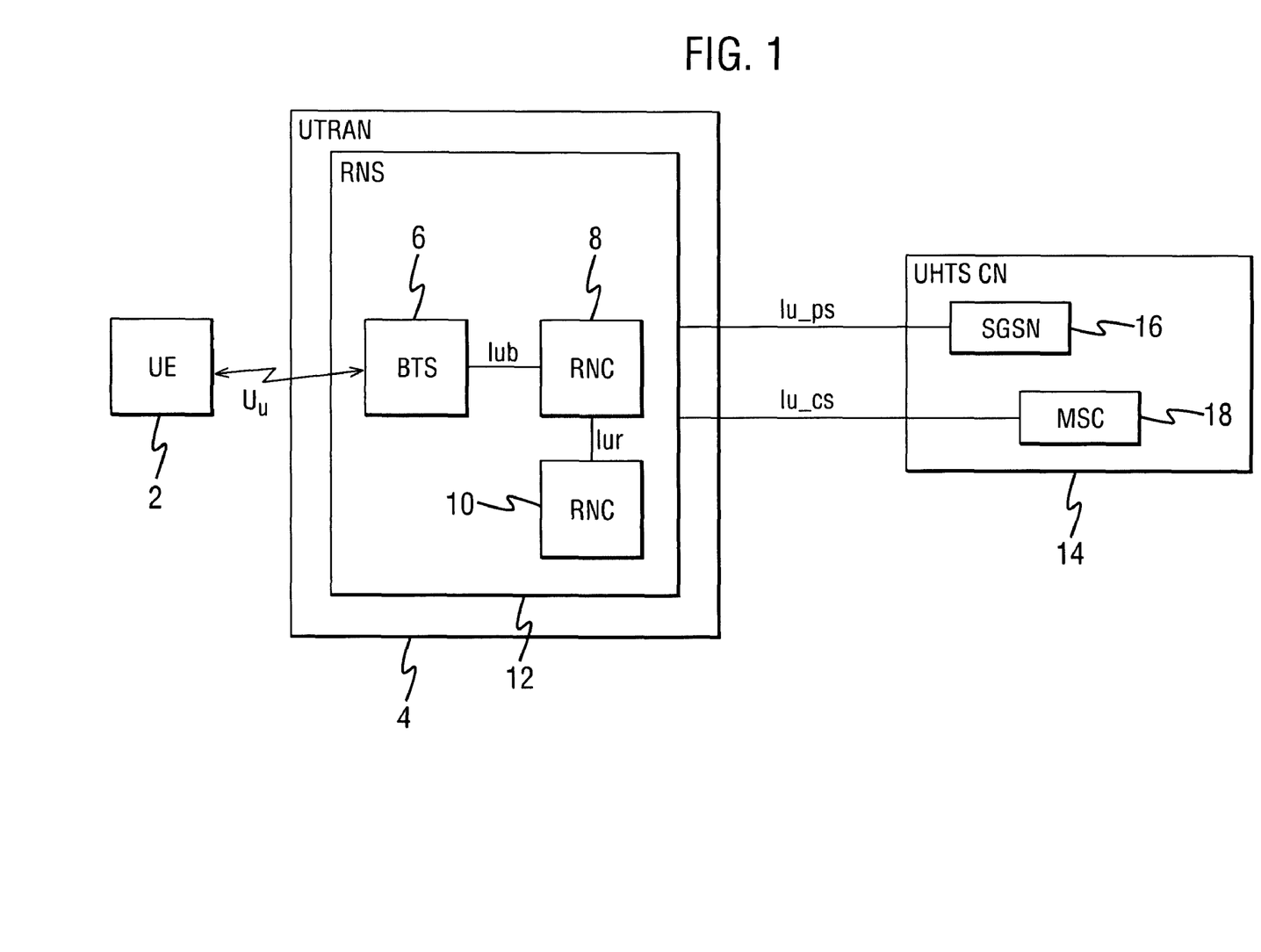
FIG. 1 is a schematic diagram of a UTRAN architecture.

FIG. 1 is a schematic diagram of the architecture of a universal telecommunication radio access network (UTRAN). A user equipment 2 in the form of a mobile telephone or the like is connected to a radio access network 4 over a radio signalling interface Uu. The user equipment could be any mobile station such as a personal computer, laptop, personal organiser, etc. The radio access network 4 comprises a plurality of base stations (BTS), only one of which is shown in FIG. 1, which are controlled by radio network controllers (RNC). A first radio network controller 8 is shown connected to the base station 6 over the Iub interface. In fact, as will become clear later, it is normal for a radio network controller 8 to control a plurality of base stations 6. The radio network controller 8 communicates with a second radio network controller 10 over an Iur interface. The radio network controllers and base stations constitute a radio network sub-system RNS 12. The radio access network 4 communicates with a universal mobile telecommunications services (UMTS) core network CN 14. The core network 14 communicates with the radio access network 4 over an Iu interface which contains an Iu_ps interface for packet switched services and an Iu_cs interface for circuit switched services. The Iu_ps interface communicates with a serving GPRS support node (SGSN) 16 of the core network 14, and the Iu_cs interface communicates with a mobile switching centre (MSC) 18 of the core network 14. While the invention is described in the context of the UTRAN network, it will readily be appreciated that the concepts underlying the invention are equally applicable to GSM, EDGE, and GERAN networks.

Figure 2:
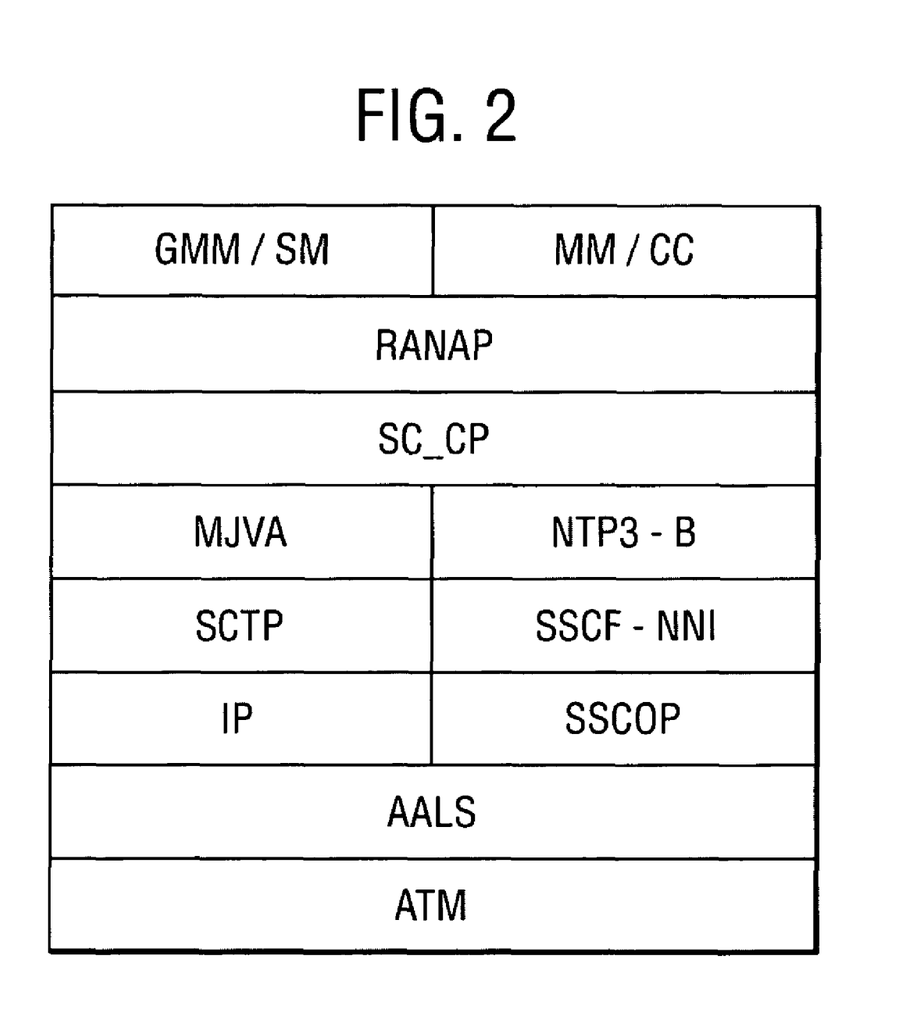
FIG. 2 is a schematic diagram of a protocol stack.

The following description is predominantly concerned with the establishment and release of radio access bearers (RABs) on the radio access network side. UTRAN radio access bearers are requested and managed in a radio access network application part (RANAP) which is the radio network layer signalling protocol for the Iu interface. The protocol stack for the Iu interface is shown in FIG. 2. The individual layers will not be described in detail because the stack is well known to a person skilled in the art. Generally, circuit switched communications are handled on the right hand side of the stack and packet switched communication is handled on the left hand side of the stack. The RANAP layer is a common layer which, as mentioned, manages RABs over the Iu interface.

To provide communication between the user equipment 2 and the core network 14, a physical signalling channel is set up between the base station 6 and the user equipment 2 under the control of the RNC 8, which itself is controlled by the MSC 18 in the core network 14. Each physical channel can carry one or more radio access bearers established on the radio access network side between the radio network controller 8 and the user equipment 2. Note however that only one RAB is visible to the RAN at any given time. The set up of channels at the physical level will not be discussed herein because it is well known to a person skilled in the art. In some cases, an end user can have two services, for example a first radio access bearer can provide video, and a second radio access bearer can provide speech. The end user can switch between these services and so both radio access bearers remain established for as long as a user requires both services to be available. That is, the MSC maintains a record of both services so that the bearer which is not being used is nevertheless held available for the user to switch back to it quickly. That is, a user does not need to undergo a new set up procedure each time he switches between the services, because the same physical channel is used.

Figure 3:
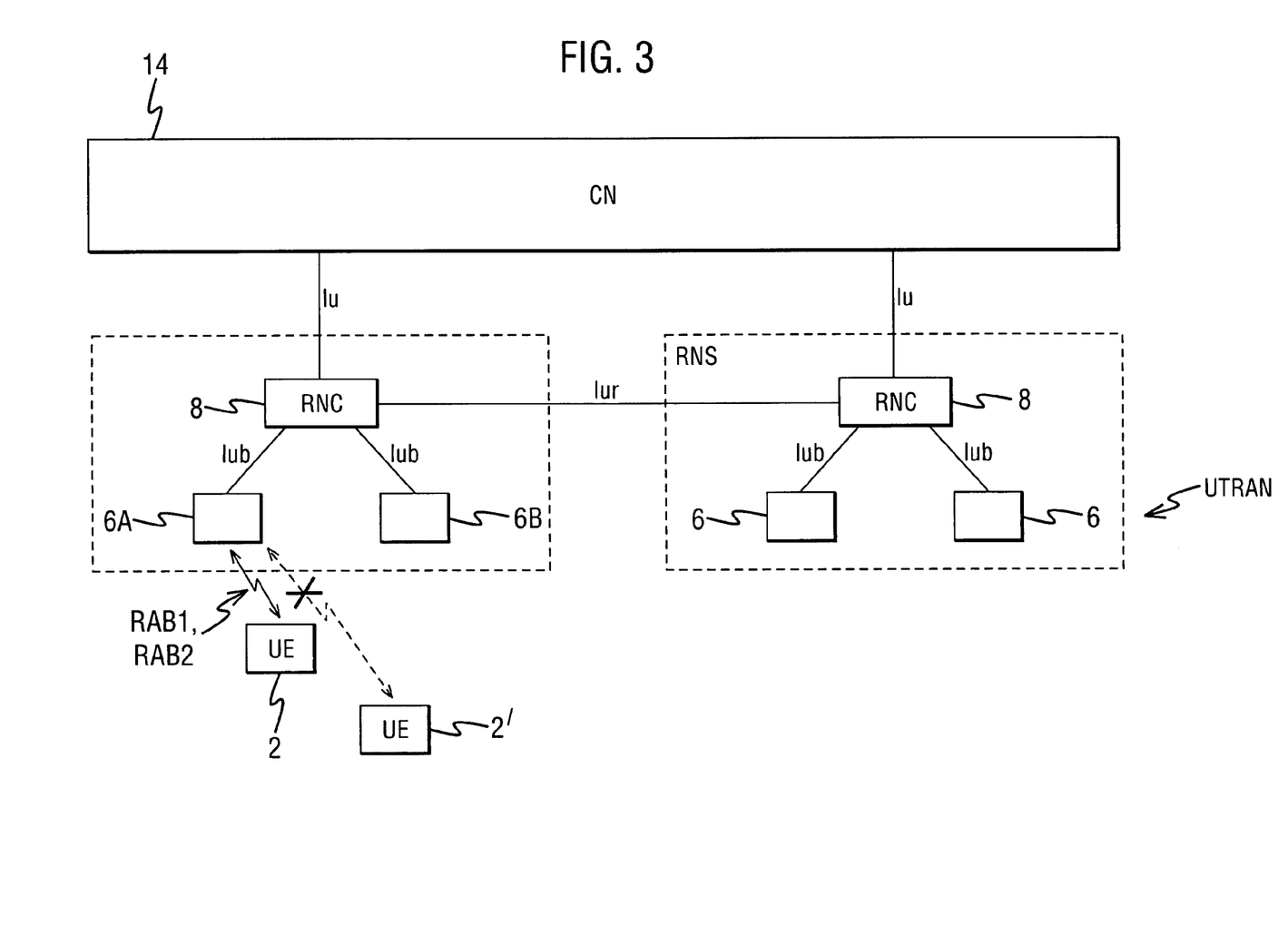
FIG. 3 is a schematic diagram of a wireless communication system illustrating the problem with the delivery of multiple services of differing requirements.

FIG. 3 is a schematic diagram of a mobile communications network system illustrating the problem that can arise in such a situation. Like numerals denote like parts as in FIG. 1. Consider the user equipment 2. This is in communication with a first base station denoted 6A (which is referred to in the UTRAN protocol as a Node B, but will be referred to herein as a base station). The user equipment 2 is currently receiving both video and speech services via radio access bearers RAB1, RAB2 which have been established between the core network 14 and the user equipment 2. As the mobile terminal moves within the network, it can come to a situation where the nature of the physical signalling connection is no longer strong enough to support at least the higher demand service (in this case video). In FIG. 3, this position of the user equipment is shown dotted and denoted by 2'. This situation could occur for other reasons, for example if a number of other users arrive in the network such that the resources of the network need to be shared out amongst a greater number of users. In any case, when the higher demand service can no longer be supported at the physical signalling level, the entire connection is dropped or handed over to another radio network controller 8. This is denoted by the cross on the radio link between the base station 6A and the newly positioned user equipment 2'.

Figure 4:
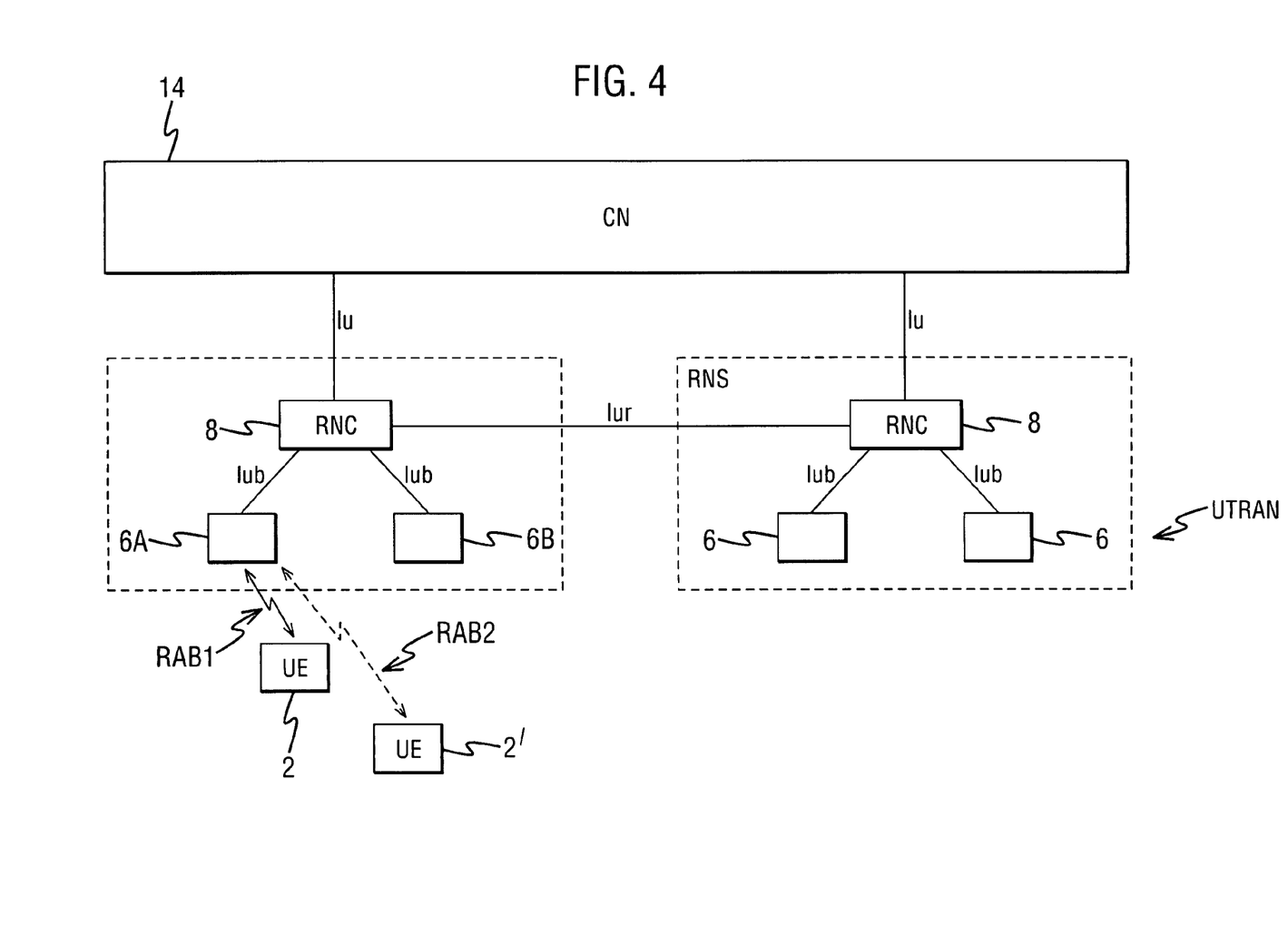
FIG. 4 is a schematic diagram of a wireless communication system illustrating an embodiment of the invention.

A solution to that problem is provided by the embodiments of the present invention described herein, the principle of which is illustrated in FIG. 4. The inventors have realised that there is no need to terminate the connection entirely, when the lower demand service of the two services (speech in this case) can still be supported at the physical signalling level. Thus, in the present case, the first radio access bearer RAB1 which supported the video service is modified into a second radio access bearer RAB2 at the new position of the user equipment 2', so that the user can still maintain at least one of the services he requested. The second radio access bearer RAB2 has different parameters based on an upgrade/downgrade indicator, as will now be described with reference to FIG. 5. The RANAP specification defines messages supplied from the core network to the radio network controller for the modification and/or release of already established RABs and/or the establishment of new RABs for a given UE. This message is the RAB assignment request message. Each RAB assignment request message can contain a list of RABs to establish or modify with their bearer characteristics, or a list of RABs to release. For each RAB requested to establish or modify, the message contains a number of elements which include:

RAB ID (identity)
NAS Binding Information
RAB Parameters
Data Volume Reporting Indication (only for PS)
User Plane Mode
Transport Layer Address
Iu Transport Association
DL/UL GTP-PDU sequence number
DL/UL N-PDU sequence number.

For each RAB request to release, the message contains:
RAB ID
Cause.

The RAB parameters can include a number of elements, including for example allocation/retention priority. In particular, in order to implement the present invention, the RAB parameters include an downgrade/upgrade indicator which indicates the downgrade/upgrade possibilities for the RAB based on the requirements of the service which it is delivering.

Figure 5:
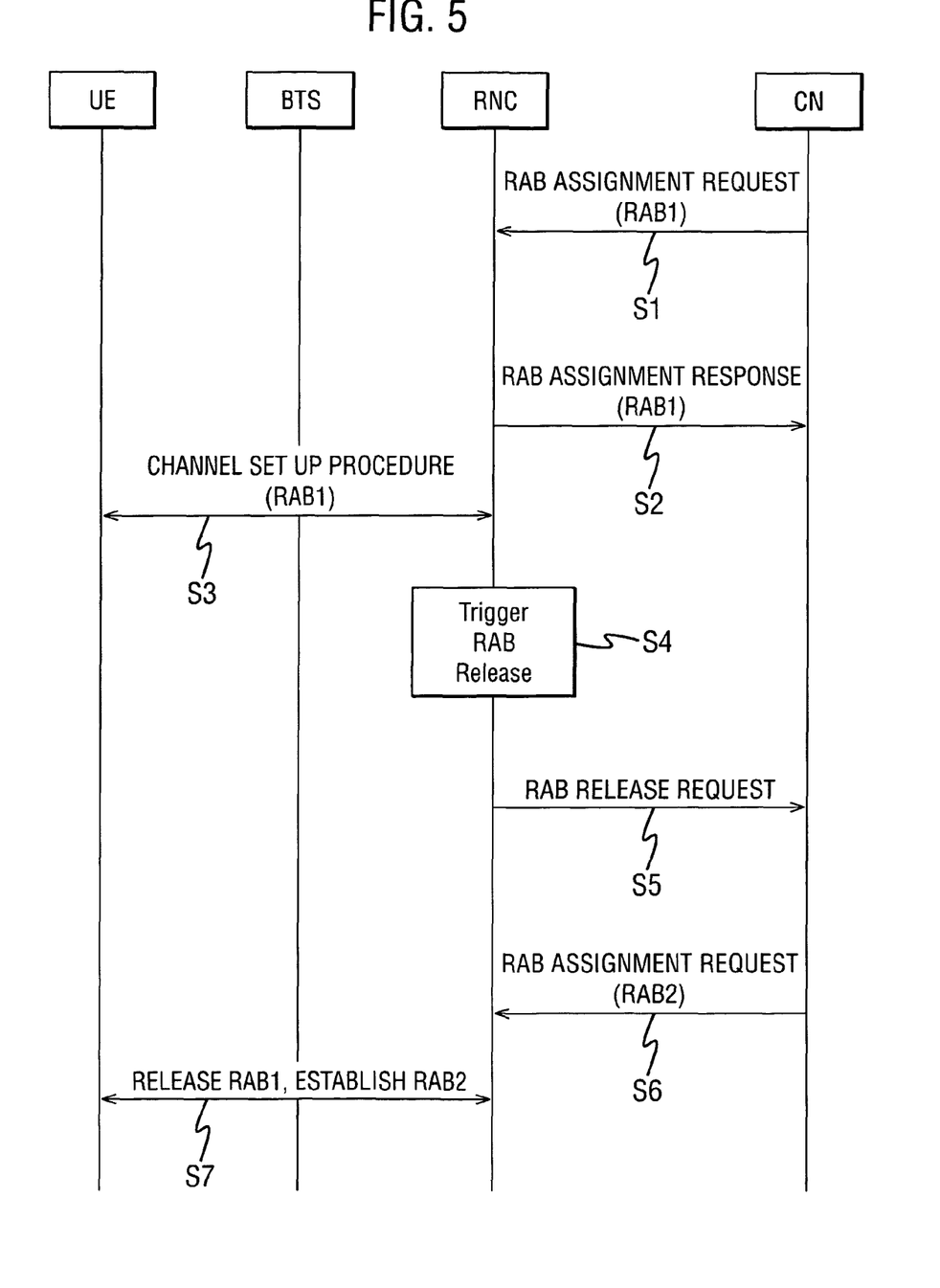
FIG. 5 is a message exchange chart illustrating one way of implementing the invention.

According to FIG. 5 an RAB assignment request message (31) is dispatched from the core network 14 to the radio network controller 8 requesting the establishment of a radio access bearer for delivering services, e.g. video or speech. An RAB assignment response message (32) is dispatched from the radio network controller to the core network indicating that this is acceptable, and then a channel set up procedure (53) is implemented on the network side for a radio access bearer for video RAB 1. The radio access bearer is associated with a downgrade/upgrade indicator indicating the threshold level for services which it can carry.

The radio network controller holds threshold levels for managing the allocation of physical signalling channels to implement the radio access bearers. In the present case, for each radio access bearer it holds a threshold level for the services deliverable by that particular radio access bearer. That is, one threshold indicates the need to downgrade. If, when the level of services in the network deteriorate to that threshold, the RAB has downgrade indicator on, an RAB release request or is sent to the CN. Vice versa, another threshold indicates the need to upgrade. If, when the level of services improves to that threshold, the RAB has upgrade indicator on, a RAB release request is likewise sent to the CN. That is, when the user equipment 2 is faced with a situation where its connection is getting too poor to maintain the quality of service required by the more demanding service, the RNC determines that in fact, the lower demand service (54) could still be implemented and issues an RAB release request (56) to the core network defining the radio access bearer that can no longer be maintained. In this case that is RAB1 which was delivering the video service. The core network responds by returning a new RAB assignment request which in this case is a request for release of the radio access bearer RAB1 and this release request is implemented (57) at the radio network controller so that the physical channel is maintained but carrying a modified radio access bearer RAB2 delivering speech. When the radio conditions improve again, thus that the physical channel could support the more demanding service, an RAB release request is dispatched from the RNC to the CN, and the radio access bearer is modified back to the original more demanding requirements.

Figure 6:
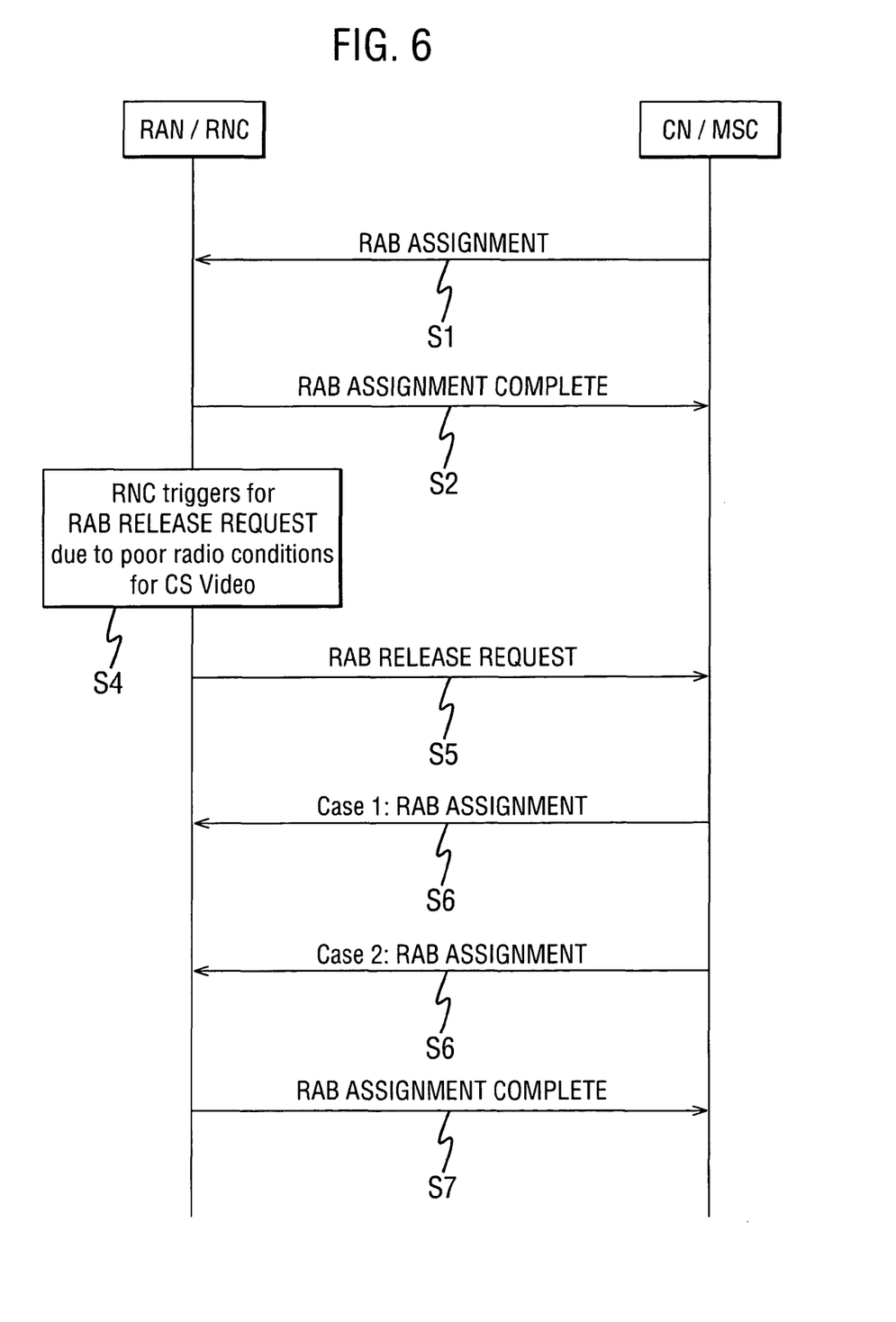
FIG. 6 is a message exchange chart illustrating one way of implementing the invention.

Reference is now made to FIG. 6 which shows in more detail the exchange of messages between the RNC and the CN.

Step numbers are labelled as in FIG. 5. According to step S1, an RAB assignment message is dispatched from the CN to the RNC to establish a radio access bearer to support CS video, including an indication for a downgrade/upgrade support/allowance. At step S2, and RAB assignment complete message for CS video is returned. This assumes that the radio access bearer has been established using a physical channel set-up procedure as described above with reference to FIG. 5.

The RNC includes a trigger mechanism which implements at step S4 a trigger for an RAB release request to be issued due to radio conditions which become too poor to maintain CS video. Thus, at step S5 an RAB release request is sent to the core network CN. The RAB release request defines a new cores value indicating that a fallback for speech should be initiated. The core network can implement the RAB release request in two different ways. According to step S6, case 1 an RAB assignment request message is issued which modifies the existing radio access bearer with new RAB parameters for speech, and including the downgrade/upgrade indicator. The inclusion of this indicator will allow the RAB to be modified later if radio conditions improve again, as described above with reference to FIG. 5.

Alternatively, in accordance with step S6, case 2, the RAB assignment message can cause the release of the radio bearer for CS video, and establishment of a different radio access bearer to support speech. The radio access bearer which is established to support speech will include the downgrade/upgrade indicator.

The RNC returns an RAB assignment complete message once the necessary action has been taken in response to the RAB assignment message according to case 1 or case 2. According to case 1, a single RAB assignment complete message is returned confirming the RAB modification. According to case 2, two messages are returned, one to confirm that the RAB for CS video has been released, and a second to confirm that establishment of the RAB for speech.

This technique is useful in a multiple radio access bearer situation to maintain one of the alternative services for the user equipment in bad radio conditions, instead of losing all of the connections. This is useful in a situation with the simultaneous usage of real time packet switched (RTPS) and/or circuit switched (CS) services, where delay and quality requirements are critical.

The invention claimed is:

1. A method, comprising:
    establishing a radio access bearer for delivering one of a set of services to an end user, each service having certain delivery requirements;
    determining in a radio access network of a wireless communications system that the delivery requirement for one of said services cannot be met;
    advising a core network associated with the radio access network that the delivery requirement for the said one service cannot be met; and
    on receiving a request from the core network to modify the established radio access bearer, modifying the established radio access bearer to provide a modified radio access bearer to allow at least one other service in the set to be delivered to that end user on the modified radio access bearer.

2. A method according to claim 1, further comprising:
    re-establishing the other services when it is determined that the delivery requirements for those services can be met.

3. A method according to claim 1, wherein one of said services is speech.

4. A method according to claim 1, wherein one of said services is video.

5. A method according to claim 1, wherein the establishing a radio access bearer includes dispatching a radio access bearer assignment request defining the radio access bearer from the core network to the radio access network.

6. A method according to claim 5, wherein the establishing a radio access bearer comprises transmitting a radio access bearer assignment response message from the radio access network to the core network.

7. A method according to claim 1, wherein the radio access bearer includes an indication about the delivery requirements of the services.

8. A method according to claim 7, wherein the indication is a downgrade indicator and the radio access network uses said indication to determine whether, in the situation that the delivery requirements for the said one service cannot be met, the delivery requirements for other services can be met, and to maintain the radio access bearer accordingly.

9. A method according to claim 7, wherein the indication is an upgrade indicator which is used to re-establish the other service(s) when the delivery requirements are met.

10. A method according to claim 1, wherein the radio access network is a universal telecommunications radio network.

11. A system, comprising:
    a radio access network;
    a core network;
    at least one end user receiving one of a set of services delivered by an established radio access bearer, each service having certain delivery requirements;
    a determiner configured to determine in the radio access network that the delivery requirement of one of said services cannot be met;
    an advisor configured to advise the core network that the delivery requirement of one of said services cannot be met ; and
    a provider configured to provide a modified radio access bearer to allow at least one other service in the set to be delivered to that end user on the modified radio access bearer, by modifying the radio access bearer on receiving a request from the core network to modify the established radio access bearer.

12. The system according to claim 11, wherein said provider is configured to modify the radio access bearer.

13. An apparatus, comprising:
    a determiner configured to determine that the delivery requirement for one of a set of services to be delivered to an end user cannot be met in a radio access network of a wireless communications system;
    an advisor configured to advise a core network associated with the radio access network that the delivery requirement of one of said services cannot be met; and
    a provider configured to provide a modified radio access bearer to allow at least one other service in the set to be delivered to that end user on the modified radio access bearer, by modifying an established radio access bearer on receiving a request from the core network to modify the established radio access bearer.

14. The apparatus according to claim 13, wherein the apparatus is or is comprised in a radio network controller.

15. A computer-readable storage medium encoded with instructions that, when executed by a computer, perform a process, the process comprising:
- determining in a radio access network of a wireless communications system that the delivery requirement of one of a set of deliverable services cannot be met;
- advising the core network that the delivery requirements for the said one service cannot be met; and
- providing a modified radio access bearer to allow at least one other service in the set to be delivered to that end user on the modified radio access bearer, by modifying an established radio access bearer on receiving a request from the core network to modify the established radio access bearer.

16. A system, comprising:
- a radio access network;
- at least one end user receiving one of a set of services delivered by a radio access bearer, each service having certain delivery requirements;
- means for determining in the radio access network that the delivery requirement of one of said services cannot be met;
- advising means for advising the core network that the delivery requirement of one of said services cannot be met; and
- means for providing a modified radio access bearer to allow at least one other service in the set to be delivered to that end user on the modified radio access bearer, by modifying an established radio access bearer on receiving a request from the core network to modify the established radio access bearer.

17. An apparatus, comprising:
- at least one memory including computer program code,
- at least one processor,
- wherein the at least one memory and the computer program code are configured to, with the at least one processor, cause the apparatus at least to
- determine that the delivery requirement for one of a set of services to be delivered to an end user cannot be met in a radio access network of a wireless communications system;
- advise a core network associated with the radio access network that the delivery requirement of one of said services cannot be met; and
- provide a modified radio access bearer to allow at least one other service in the set to be delivered to that end user on the modified radio access bearer, by modifying an established radio access bearer on receiving a request from the core network to modify the established radio access bearer.

18. The apparatus of claim 17, wherein the apparatus is or is comprised in a radio network controller.

19. The apparatus of claim 17, wherein the apparatus is configured to re-establish the other services when it is determined that the delivery requirements for those services can be met.

20. The apparatus of claim 17, wherein one of said services is speech.

21. The apparatus of claim 17, wherein one of said services is video.

22. The apparatus of claim 17, wherein the radio access bearer includes an indication about the delivery requirements of the services.

23. The apparatus of claim 22, wherein the indication is a downgrade indicator and the radio access network uses said indication to determine whether, in the situation that the delivery requirements for the said one service cannot be met, the delivery requirements for other services can be met, and to maintain the radio access bearer accordingly.

24. The apparatus of claim 22, wherein the indication is an upgrade indicator which is used to re-establish the other service(s) when the delivery requirements are met.

25. The apparatus of claim 17, wherein the radio access network is a universal telecommunications radio network.

26. The apparatus of claim 13, further comprising:
- an establisher configured to re-establish other services when it is determined that the delivery requirements for the other services can be met.

27. The apparatus of claim 13, wherein the apparatus is configured to, in establishing a radio access bearer, receive a radio access bearer assignment request defining the radio access bearer dispatched from the core network to the radio access network.

28. The apparatus of claim 27, wherein the apparatus is configured to establish a radio access bearer by transmitting a radio access bearer assignment response message from the radio access network to the core network.

29. The apparatus of claim 13, wherein the radio access bearer includes an indication about the delivery requirements of the services and wherein the indication is a downgrade indicator and the radio access network uses said indication to determine whether, in the situation that the delivery requirements for the said one service cannot be met, the delivery requirements for other services can be met, and to maintain the radio access bearer accordingly.

* * * * *